July 28, 1953  P. C. JANSEN ET AL  2647,255
TELEVISION RECEIVER
Filed Sept. 6, 1950  2 Sheets-Sheet 1

INVENTORS
PIETER CORNELIS JANSEN &
GEORGE WEEHUIZEN
BY
AGENT

INVENTORS
PIETER CORNELIS JANSEN
GEORGE WEEHUIZEN

Patented July 28, 1953

2,647,255

UNITED STATES PATENT OFFICE 2,647,255

TELEVISION RECEIVER

Pieter Cornelis Jansen and George Weehuizen, Eindhoven, Netherlands, assignors to Hartford National Bank and Trust Company, Hartford, Conn., as trustee Application September 6, 1950, Serial No. 183,426
In France September 21, 1949

3 Claims. (Cl. 348—368)

The invention relates generally to television receivers comprising a cathode-ray tube, and more particularly to those receivers wherein the screen of the cathode-ray tube constitutes the image surface of a Schmidt optical system.

Generally speaking, such optical systems comprise a spherical mirror arranged opposite the aforesaid screen of the tube and an element for spherical aberration correction. The latter usually comprises a thin plate having one or two non-spherical surfaces. The correction element which may be comprised of a meniscus lens, concentrates the light radiated by the screen of the tube into a beam. It is known to improve the contrast effect of the image formed by eliminating the central part of the mirror or by rendering it inactive in some other manner such as by shielding, for example, but this measure results in a marked loss of the light which ultimately impinges on the viewing screen. Accordingly, efforts will ordinarily be made to minimize the inactive central part of the mirror.

The invention is based on recognition of the fact that the light radiated by the screen of the tube to the central part of the mirror allows the projection of a second and equivalent image with the use of a second optical system. Thus, in accordance with the invention, there is arranged in the central aperture of the spherical mirror of a Schmidt system, an optical system adapted to project a second image which is equivalent to that originally projected by the said Schmidt system.

The phrase "in the central aperture of the mirror" does not imply by any means that this system cannot project from either of the surfaces of the mirror, that is to say cannot be displaced axially of the mirror, but the portion of light reaching the aperture must be utilized to the utmost by the second system. The two images may be projected, for example, onto two screens parallel to each other and arranged on either side of the apparatus but the two projection directions are preferably at right angles to each other.

The first system for projection onto two screens parallel to each other, as noted just above, may be a conventional Schmidt system in which all the elements comprising the same are located in the straight line of the optical axis thereof with the tube screen located in the focal plane of the spherical mirror and the correcting element beyond. The second system may be a Schmidt system comprising a flat mirror set at an angle of 45° to the optical axis thereof and provided with an aperture in which the screen of the tube is arranged, this flat mirror being arranged in the light path between the spherical mirror and the correction element. This system is described, for example, in U. S. Patent No. 2,476,124 to P. M. Van Alphen for a "Folded Schmidt Television Projector."

It should be noted that it is known to combine a cathode-ray tube with an optical system comprising a concave mirror wherein this concave mirror is provided with a small aperture. In such known constructions, a second optical system is arranged to control the image produced on the screen of the tube. This second system allows the passage of a very small portion of the total light supply from the screen of the tube. The present invention is not concerned with such devices, wherein the images are not equivalent.

In order that the invention may be more clearly understood and readily carried into effect, it will now be described with reference to the accompanying two figures of the drawings, in which like parts are designated by the same reference numerals and in which.

Figure 1:
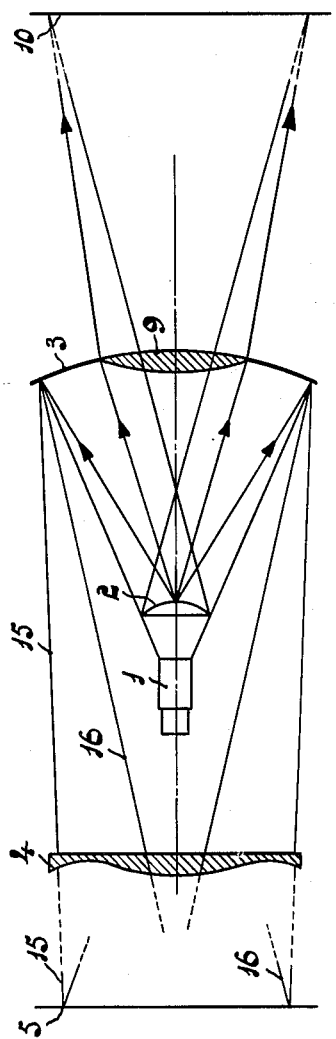
Fig. 1 shows diagrammatically a horizontal sectional view of the optical part of a television receiver, in accordance with one embodiment of the present invention, in which the images are projected onto two parallel planes.

The receiver shown in Figure 1, and which allows projecting an image onto two parallel screens facing one another, comprises a cathode-ray tube 1, of which the screen 2 is arranged approximately at the focal plane of the spherical mirror 3. The beam reflected by this mirror passes through a correction element 4 comprising a thin plate having a non-spherical surface. The image is thus projected onto a screen 5 (shown close to element 4 due to lack of space). Accordingly, the rays 15 and 16 are shown in dotted lines beyond the element 4.

The mirror 3 is provided with an aperture, in which is arranged a second optical system, which is represented diagrammatically by a lens 9. This lens projects the light onto a screen 10 (again shown close to the remainder of the device due to lack of space).

In order that the images produced on the two screens should be equivalent, the quantities of light reaching the two systems must be of the same order of magnitude. This is accomplished by the suitable choice of the diameters and powers of the Schmidt system (mirror 3, element 4), on the one hand, and the lens 9 on the other. When choosing the diameters of the mirror 3 and of the lens 9, allowance must, of course be made for the losses of light in the two optical systems which are due inter alia to absorption and reflection.

Figure 2:
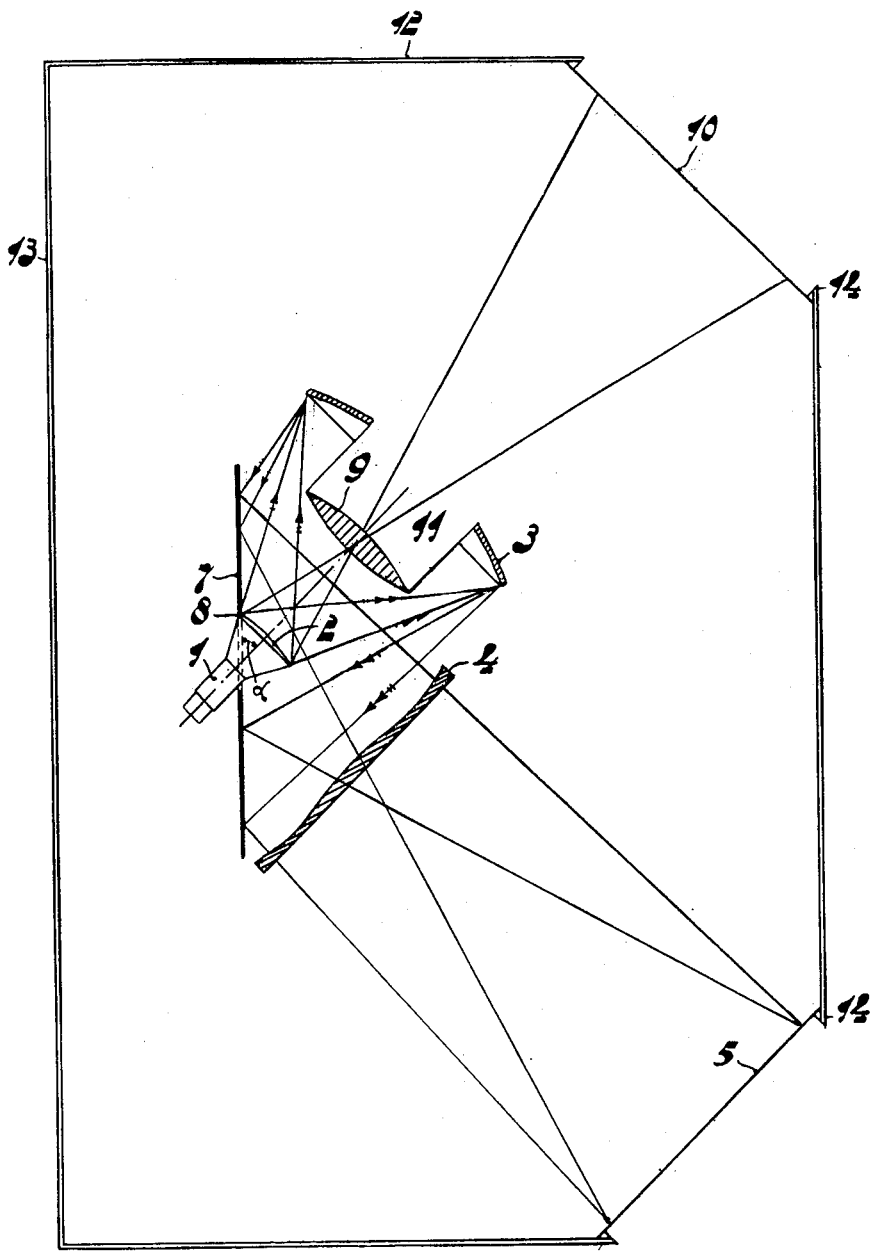
Fig. 2 is a similar sectional view of a television receiver, employing another preferred embodiment of the invention, in which the images are projected onto two planes at right angles to each other.

The device shown in Fig. 2 comprises in addition to the structures described for Figure 1 above, a flat mirror 7, which is at an angle of 45° with the optical axis of the Schmidt system and which is arranged in the light path between the spherical mirror 3 and the correction element 4. This flat mirror 7 is provided with an aperture 8, in which the screen 2 of the tube 1 is arranged. The lens 9 may be supported in part of mirror 30 by means of a holder 11 as shown in the figure. The receiver is housed in a cabinet whose long wall 13 may be arranged against a wall of a room, for example. The spectators will then be arranged in a semi-circle in front of the receiver. The screens 5 and 10 may be shielded by rims 14, for example, so that the light emanating from one screen does not interfere with the spectators in front of the other screen.

What we claim is:

1. A television receiver comprising a Schmidt optical system, and a cathode-ray tube; said Schmidt optical system comprising a spherical mirror and a correcting element, said cathode-ray tube comprising a screen positioned in the image surface of said spherical mirror, said spherical mirror having the central part thereof inactive, a second optical system located in the zone of said inactive central part of said spherical mirror and adapted to project an image equivalent to that projected by said Schmidt optical system, and means for projecting the image produced by said Schmidt optical system at substantially right angles to the image produced by said second optical system.

2. A television receiver comprising a Schmidt optical system and a cathode-ray tube; said Schmidt optical system comprising a spherical mirror and a correcting element, said cathode-ray tube comprising a screen positioned in the image surface of said spherical mirror, said spherical mirror having the central part thereof inactive, a second optical system located in the zone of said inactive central part of said spherical mirror and adapted to project an image equivalent to that projected by said Schmidt optical system, a first screen located on the optical axis of said second optical system and adapted to receive said image projected thereby, means for projecting the image produced by said Schmidt optical system at substantially right angles to the image produced by said second optical system, and a second screen located on the optical axis of said Schmidt optical system and adapted to receive said image projected thereby.

3. A television receiver comprising a cabinet, a Schmidt optical system and a cathode-ray tube housed in said cabinet; said Schmidt optical system comprising a spherical mirror and a correcting element, said cathode-ray tube comprising a screen positioned in the image surface of said spherical mirror, said spherical mirror having the central part thereof inactive, a second optical system located in the zone of said inactive central part of said spherical mirror and adapted to project an image equivalent to that projected by said Schmidt optical system, a first screen mounted on said cabinet and located on the optical axis of said second optical system and adapted to receive said image projected thereby, means for projecting the image produced by said Schmidt optical system at substantially right angles to the image produced by said second optical system, and a second screen mounted on said cabinet and located on the optical axis of said Schmidt optical system and adapted to receive said image projected thereby, said first and second screens being positioned at substantially right angles to each other.

PIETER CORNELIS JANSEN.
GEORGE WEEHUIZEN.

References Cited in the file of this patent

UNITED STATES PATENTS

| Number | Name | Date |
|---|---|---|
| 2,476,124 | Alphen | July 12, 1949 |
| 2,489,835 | Traub | Nov. 29, 1949 |
| 2,490,740 | Nicoll | Dec. 6, 1949 |
| 2,508,764 | Miller | May 23, 1950 |